(12) United States Patent
Sowa

(10) Patent No.: US 6,705,076 B1
(45) Date of Patent: Mar. 16, 2004

(54) ROCKET THRUST CHAMBER

(75) Inventor: Armin Sowa, Ottobrunn (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 10/009,726

(22) PCT Filed: Jun. 6, 2000

(86) PCT No.: PCT/DE00/01826
§ 371 (c)(1),
(2), (4) Date: Dec. 17, 2001

(87) PCT Pub. No.: WO00/79116
PCT Pub. Date: Dec. 28, 2000

(30) Foreign Application Priority Data

Jun. 17, 1999 (DE) .......................... 199 27 734

(51) Int. Cl.⁷ .............................. F02K 9/62; F02K 9/97
(52) U.S. Cl. ...................... 60/258; 60/770; 239/265.11; 29/890.01
(58) Field of Search .................. 60/257, 258, 770; 239/265.11; 29/890.01

(56) References Cited

U.S. PATENT DOCUMENTS

| | | | | |
|---|---|---|---|---|
| 3,044,257 A | * | 7/1962 | Shesta ........................ | 60/260 |
| 3,167,909 A | * | 2/1965 | Thielman ..................... | 60/265 |
| 3,443,384 A | * | 5/1969 | Webb ........................ | 60/263 |
| 5,613,299 A | * | 3/1997 | Ring et al. ................ | 29/890.01 |
| 6,079,101 A | * | 6/2000 | Kreiner et al. ........... | 29/890.01 |
| 6,138,450 A | * | 10/2000 | Kreiner et al. ................. | 60/257 |
| 6,138,451 A | * | 10/2000 | Kreiner et al. ................. | 60/258 |
| 6,205,661 B1 | * | 3/2001 | Ring ........................ | 29/890.01 |
| 6,269,630 B1 | * | 8/2001 | Kreiner et al. ................. | 60/258 |
| 6,381,949 B1 | * | 5/2002 | Kreiner et al. ................. | 60/258 |
| 6,397,580 B1 | * | 6/2002 | Stechman, Jr. et al. ....... | 60/258 |

FOREIGN PATENT DOCUMENTS

| | | |
|---|---|---|
| DE | 3300930 A1 * | 7/1984 |
| EP | 0702093 A1 * | 3/1996 |

OTHER PUBLICATIONS

Barrere, M. et al "Rocket Propulsion", 1960, Elsevier Publishing Co., pp. 313–317.*

* cited by examiner

*Primary Examiner*—Ted Kim
(74) *Attorney, Agent, or Firm*—Crowell & Moring LLP

(57) ABSTRACT

Thrust chamber housing for a driving mechanism for space travel applications which is fastened to an injection head with its first end and which includes a combustion chamber housing of a highly heat-resistant steel, a nozzle element of a platinum-iridium alloy, and an expansion nozzle housing of a highly heat-resistant steel, whereby the combustion chamber housing is welded through a first intermediate ring with the nozzle element and the nozzle element is welded through a second intermediate ring with the expansion nozzle housing by means of welded connections, whereby the first and the second intermediate ring are made of a platinum-rhodium alloy.

12 Claims, 1 Drawing Sheet

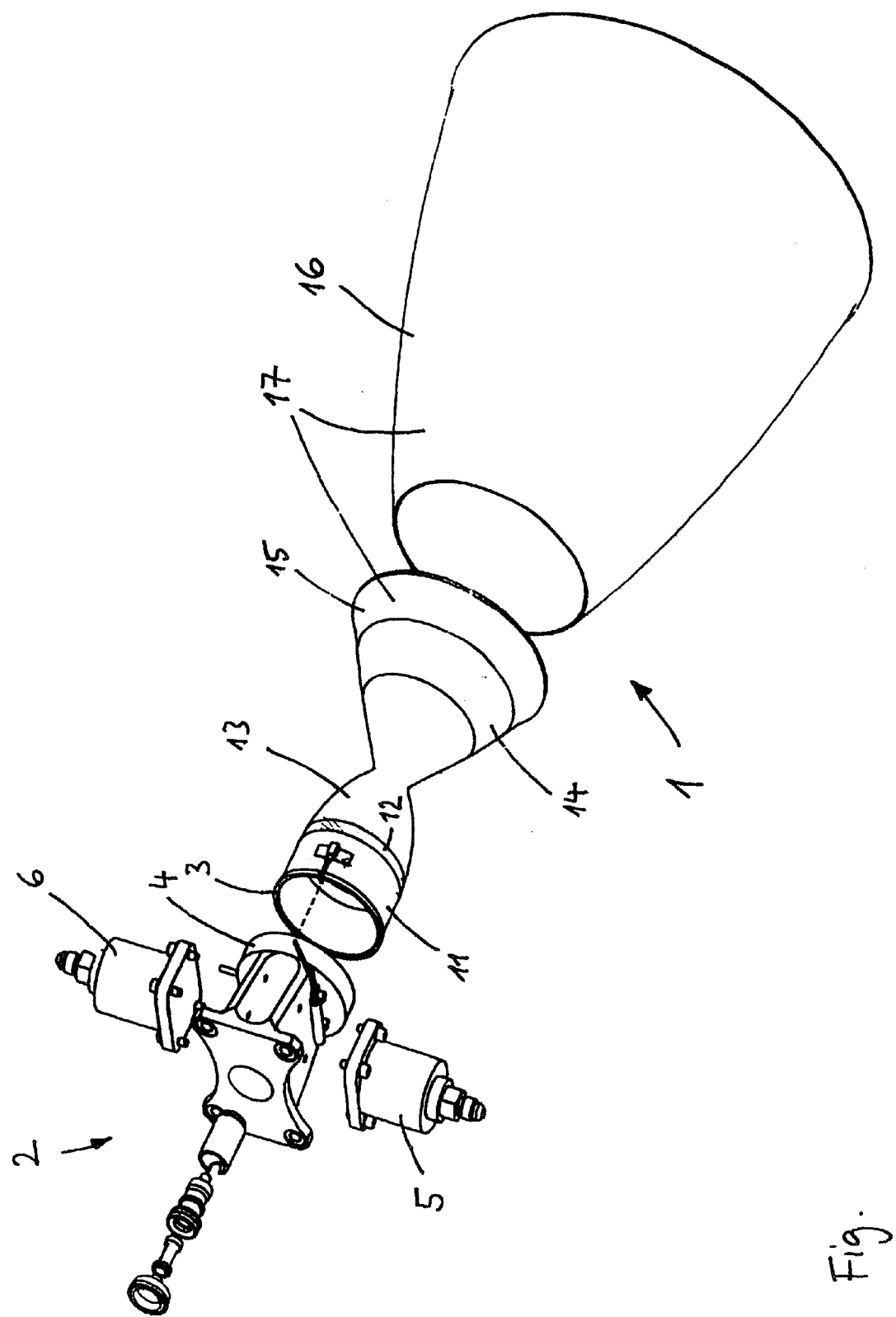

ROCKET THRUST CHAMBER

BACKGROUND AND SUMMARY OF THE INVENTION

The invention concerns a thrust chamber of a driving mechanism for satellites and transport devices for space travel uses as well as its position control drive mechanism and especially for transport devices which bring satellites from the flight path of the carrier rockets into the satellite service path.

Drive mechanisms of this type have an injection head through which the propellants, which for example the fuel MMH (hydrazine compound) and an oxidizer $N_2O_4$ (nitrogen tetroxide) are injected into the thrust chamber with a combustion chamber, nozzle element and expansion nozzle installed on the injection head. Very high temperatures arise during combustion of the propellants, in the range up to 2600° C. in the core of the thrust chamber, that is, in the combustion gases. The wall of the nozzle element is heated up here to a temperature of approximately 1600° C. For this reason, up until now, nozzle elements have largely been used in the walls of which cooling channels are provided which are cooled with propellants which are subsequently fed to combustion. Regeneratively cooled nozzle elements of this sort are nonetheless expensive to manufacture and have disadvantages in operating behavior during the ignition and shutting down of the drive mechanisms.

By using high temperature materials such as platinum-iridium (Pt—Ir) alloys, regenerative cooling construction methods of this type can be dispensed with. A disadvantage in using such high temperature materials is that these cannot be adequately joined with the materials which are used for the combustion chamber adjoining the nozzle element as well as the expansion nozzle, for example, with chromium-nickel-molybdenum alloys, using welding techniques. Owing to differences in physical properties, such as melting point, thermal expansion, specific weight, no sufficient crystalline connection takes place in the crystalline matrix structure of Pt—Ir and chromium-nickel-molybdenum alloys when these two metal alloys are welded. Scanning electron microscope (REM) observations show a marked crystalline boundary layer of a few thousandths of a millimeter thick ($\mu$ range) in the melting zone in the platinum-iridium alloy. For this reason, it is not possible to speak of a classical melting. The welded connections obtained here for this reason do not have the requisite dynamic stability and lead to breakage under vibration stress.

It is therefore an objective of the invention to create a thrust chamber for satellites and space travel transport devices where the use of regenerative nozzle elements is not necessary and whose walls possess a sufficient stability at temperatures up to 1600° C.

This objective is accomplished by providing a thrust chamber housing for a driving mechanism for space travel applications which is fastened with one end on an injection head and which has a combustion chamber housing of a highly heat-resistant steel, a nozzle element of a platinum-iridium alloy and an expansion nozzle housing of a highly heat-resistant steel, characterized in that the combustion chamber housing is welded through a first intermediate ring with the nozzle element, and the nozzle element is welded through a second intermediate ring with the expansion nozzle housing by means of welded connections, whereby the first and the second intermediate ring are made of a platinum-rhodium alloy. Further embodiments are described herein and in the claims.

The thrust chamber of the invention has the advantage that this can be manufactured relatively simply and with low costs. A further advantage is that already existing driving mechanism constructions can basically be retained and the requisite operating stability can be attained with simple modifications.

The invention will be described below on the basis of the appended drawing which shows a thrust chamber of the invention together with an injection head in a perspective, exploded representation.

DESCRIPTION OF THE DRAWINGS

The drawing depicts a thrust chamber 1 and its injection head 2. The thrust chamber 1 is constructed axially symmetrical and is joined with its end 3 facing the injection head 2 to a flange 4 of the injection head 2 preferably by means of a welded connection. Propellent shutoff valves 5, 6 are installed in each case for the fuel and the oxidizer on the injection head 2. Through these propellant shutoff valves 5, 6, the propellants, that are the fuel and the oxidizer, are fed to the injector head, whence these are fed helically to the thrust chamber 1.

Viewed from the injection head 2, the thrust chamber 1 is made of a fuel combustion chamber housing 11, a first intermediate ring 12, a nozzle element 13, a second intermediate ring 14, an adapter ring 15 and an expansion nozzle element 16. The adapter ring 15 and expansion nozzle element 16 together form the expansion nozzle 17.

The propellants are injected helically on the inner wall of the combustion chamber housing 11 and there form a cooling film which has orientation components in the axial and peripheral direction of the combustion chamber housing 11. The combustion of the propellants which have reached the interior of the combustion chamber from the cooling film takes place in the interior of the combustion chamber. In this way, the cooling film is built up axially viewed from the injection head 2. This cooling film is no longer present in the region of the nozzle element 13. In addition, an increase in the temperature of the combustion gases takes place owing to the tapering of the cross section in the nozzle element 13. In order to enable an economical manufacture of the thrust chamber 1, various materials are therefore provided for constructing the combustion chamber housing 11 and the nozzle element 13. Moreover, the materials which are suited for the high temperatures in the nozzle element 13 have a 2½ times higher specific weight than the materials provided for the fuel combustion housing 11. Since in the expansion nozzle housing 17, similar temperatures and stresses prevail as in the combustion chamber housing 11, the same materials are usually provided for the expansion nozzle housing 17 as for the combustion chamber housing 11.

In accordance with the invention, the combustion chamber housing 11 is made of a highly heat-resistant steel, preferably of a chromium-nickel-molybdenum alloy. Likewise, in accordance with the invention, the adapter ring 15 and the expansion nozzle element 16 are made of a highly heat-resistant steel, especially of a chromium-nickel-molybdenum alloy.

The nozzle element 13 is made of a platinum-iridium alloy. The first intermediate ring 12 arranged between the nozzle element 13 and the combustion chamber housing 11 is made of a platinum-rhodium alloy. Likewise, the second intermediate ring 14 is made of a platinum-rhodium alloy.

The components of the thrust chamber housing 1 are welded with one another. In this way, an uninterrupted construction of the thrust chamber housing 1 from the combustion chamber housing 11, the first intermediate ring 12, the nozzle element 13, the second intermediate ring 14, the adapter ring and the expansion nozzle element 16 is possible, so that no unevennesses arise on the interior of the thrust chamber housing 1.

The direct welding of the nozzle element 13 of platinum-iridium alloy with the combustion chamber 11 of highly heat-resistant steel as well as with the adapter ring 15 of a highly heat-resistant steel is not possible with welding techniques owing to the different physical properties of these alloys. Nevertheless, by interposing the first intermediate ring 12 between the combustion chamber housing 11 and the nozzle element 13 as well as by interposing the second intermediate ring 14 between the nozzle element 13 and the adapter ring 15, the thrust chamber housing 1 can be joined together from the combustion chamber housing 11, the expansion nozzle housing 17 and the nozzle element 13 using welding techniques by means of the first 12 and the second 14 intermediate ring so that a simple manufacture of the thrust chamber housing 1 is possible. Furthermore, the thrust chamber housing 1 of the invention with the first intermediate ring 12 and the second intermediate ring 14 has a sufficient stability at the temperatures typically occurring in the thrust chamber housing 1. Basic physical properties, especially the thermal expansion property and elasticity under mechanical stress with the platinum-rhodium alloy, as they are used for the first 12 and the second 14 intermediate ring, are situated between the values for the alloys which are provided for the combustion chamber housing 11 or the expansion nozzle housing 17 and the nozzle element 13. In this way, a better expansion behavior of regions which are situated in the area of the welding seam results, as does a reduction of stress load under vibration.

Welding of the parts of the thrust chamber housing 1 chiefly takes place by means of electron beam welding, as in this way, a low heat input into the thrust chamber housing 1 is attained during manufacture of the same.

The expansion nozzle element 16 is preferably shaped from a sheet by means of platens.

The welded connections between the parts of the thrust chamber housing 1 are preferably checked by means of a three dimensional ultrasound testing process at several sites.

What is claimed is:

1. Thrust chamber housing for a driving mechanism for space travel applications which is fastened with one end on an injection head and which has a combustion chamber housing of a highly heat-resistant steel, a nozzle element of a platinum-iridium alloy and an expansion nozzle housing of a highly heat-resistant steel, characterized in that the combustion chamber housing is welded through a first intermediate ring with the nozzle element, and the nozzle element is welded through a second intermediate ring with the expansion nozzle housing by means of welded connections, whereby the first and the second intermediate ring are made of a platinum-rhodium alloy.

2. Thrust chamber housing according to claim 1, characterized in that the welded connections are produced by means of an electron beam process.

3. Thrust chamber housing according to claim 2, characterized in that the expansion nozzle housing includes an expansion nozzle element and an adapter ring connected with the second intermediate ring using welding techniques, whereby the adapter ring is welded with the expansion nozzle element.

4. Thrust chamber housing according to claim 1, characterized in that the expansion nozzle housing includes an expansion nozzle element and an adapter ring connected with the second intermediate ring using welding techniques, whereby the adapter ring is welded with the expansion nozzle element.

5. A thrust chamber housing assembly, which is fastened in use with one end on an injection head, comprising:

a combustion engine chamber housing made of a highly heat-resistant steel, an expansion nozzle housing made of a highly heat-resistant steel, a nozzle element made of platinum-iridium alloy, interposed between the combustion engine chamber housing and the expansion nozzle housing, a first intermediate ring made of platinum-rhodium alloy connected by welding connections to the combustion chamber housing and nozzle element, and a second intermediate ring made of platinum-rhodium alloy connected by welding connection to the nozzle element and the expansion nozzle housing.

6. An assembly according to claim 5, wherein the welding connections are election beam welding connectors.

7. An assembly according to claim 6, wherein the expansion nozzle housing include an expansion nozzle element and an adapter ring connected with the second intermediate ring using welding techniques, whereby the adapter ring is welded with the expansion nozzle element.

8. An assembly according to claim 5, wherein the expansion nozzle housing includes an expansion nozzle element and an adapter ring connected with the second intermediate ring using welding techniques, whereby the adapter ring is welded with the expansion nozzle element.

9. A method of making a thrust chamber housing assembly for rocket propelled driving mechanisms for space travel, which housing assembly is connected in use with an injection head, said method comprising:

providing a combustion chamber housing made of a highly heat-resistant steel alloy, providing a nozzle element made of a platinum-iridium alloy, providing an expansion nozzle housing made of a highly heat-resistant steel, and connecting the nozzle element in between the combustion chamber housing and the expansion nozzle housing, wherein said connecting the nozzle element includes:

connecting the combustion chamber housing and nozzle element together by welding them to first intermediate ring made of a platinum-rhodium alloy, and connecting the nozzle element and nozzle housing together by welding them to a second intermediate ring made of a platinum-rhodium alloy.

10. A method according to claim 9, wherein said welding is election beam welding.

11. A method according to claim 10, wherein the expansion nozzle housing include an expansion nozzle element and an adapter ring connected with the second intermediate ring using welding techniques, whereby the adapter ring is welded with the expansion nozzle element.

12. A method according to claim 9, wherein the expansion nozzle housing includes an expansion nozzle element and an adapter ring connected with the second intermediate ring using welding techniques, whereby the adapter ring is welded with the expansion nozzle element.

* * * * *